(12) United States Patent
Kamijima

(10) Patent No.: US 6,558,516 B1
(45) Date of Patent: May 6, 2003

(54) METHOD OF FRAME PLATING AND METHOD OF FORMING MAGNETIC POLE OF THIN-FILM MAGNETIC HEAD

(75) Inventor: Akifumi Kamijima, Nihonbashi (JP)

(73) Assignee: TDK Corporation, Tokyo (JP)

( * ) Notice: Subject to any disclaimer, the term of this patent is extended or adjusted under 35 U.S.C. 154(b) by 188 days.

(21) Appl. No.: 09/713,023

(22) Filed: Nov. 16, 2000

(30) Foreign Application Priority Data

Dec. 9, 1999 (JP) .............................. 11-349768

(51) Int. Cl.[7] .......................... C23C 14/34; C23C 16/00
(52) U.S. Cl. .............................. 204/192.2; 204/192.15; 205/118; 205/135; 205/291
(58) Field of Search ................. 205/118, 135, 205/291; 204/192.15, 192.2

(56) References Cited

U.S. PATENT DOCUMENTS 5,241,440 A  *  8/1993  Ashida et al. .............. 360/126
5,438,747 A      8/1995  Krounbi et al. ................ 29/603
5,932,396 A  *  8/1999  Kamijima .................... 430/320

FOREIGN PATENT DOCUMENTS

JP            7-262519          10/1995

* cited by examiner

Primary Examiner—Rodney G. McDonald
(74) Attorney, Agent, or Firm—Oliff & Berridge, PLC

(57) ABSTRACT

In a method of frame plating, an electrode film for plating is formed on a base layer of a plating layer to be formed. Next, a resist layer is formed on the electrode layer. The resist layer is exposed to beams for exposure through the use of a mask. Next, the resist layer exposed is developed and the portion exposed is removed to form a resist frame, such that the angle θ between an inner wall of the resist frame and the bottom surface thereof exceeds 90 degrees. Next, heat treatment is performed on the resist frame, such that the angle θ becomes 90 degrees or smaller. Next, plating is performed with the electrode film as the seed layer through the use of the resist frame having gone through the heat treatment. The plating layer is thereby formed.

5 Claims, 8 Drawing Sheets

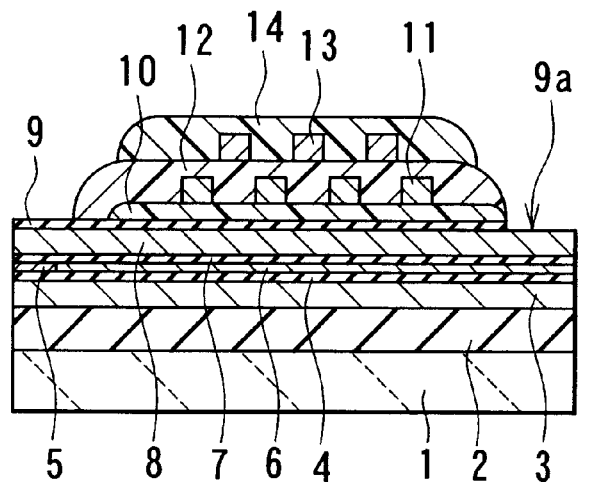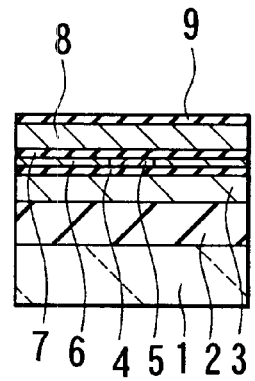
FIG. 1A  FIG. 1B
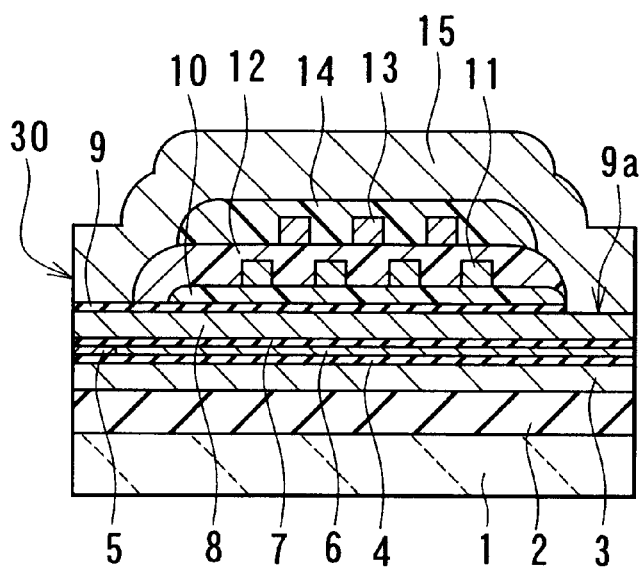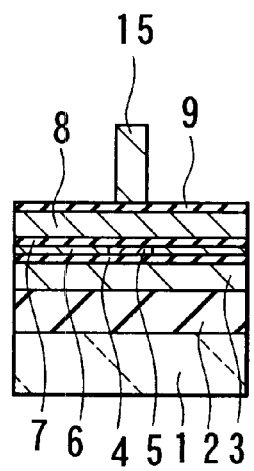
FIG. 2A  FIG. 2B

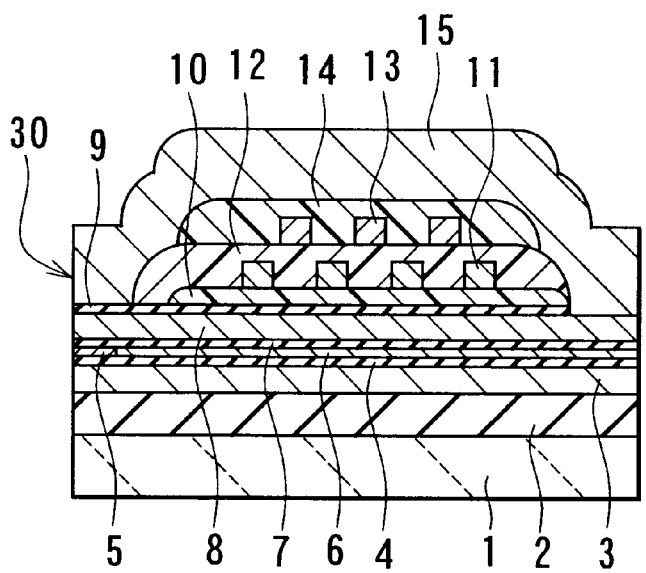
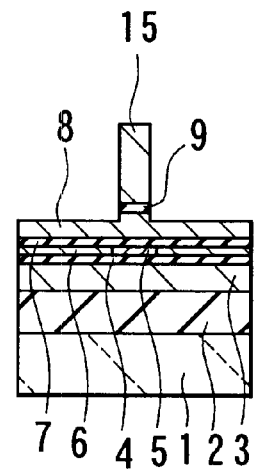
FIG. 3A  FIG. 3B
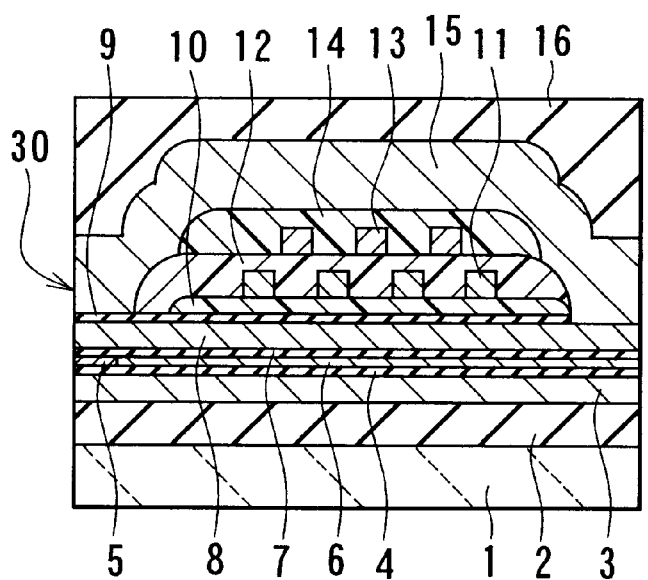
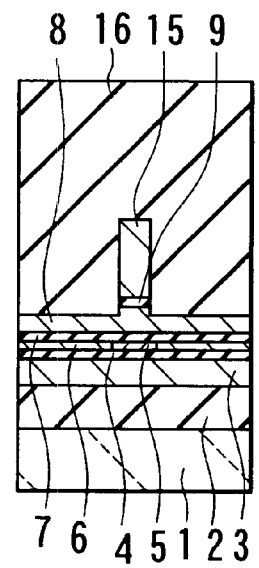
FIG. 4A  FIG. 4B

METHOD OF FRAME PLATING AND METHOD OF FORMING MAGNETIC POLE OF THIN-FILM MAGNETIC HEAD

BACKGROUND OF THE INVENTION

1. Field of the Invention

The present invention relates to a method of frame plating and a method of forming a magnetic pole of a thin-film magnetic head through the use of the frame plating.

2. Description of the Related Art

Performance improvements in thin-film magnetic heads have been sought as areal recording density of hard disk drives has increased. Such thin-film magnetic heads include composite thin-film magnetic heads that have been widely used. A composite head is made of a layered structure including a recording head having an induction-type electromagnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein the track width, that is, the width of top and bottom poles sandwiching the recording gap layer on a side of the air bearing surface (medium facing surface) is reduced down to microns or the order of submicron. Semiconductor process techniques are utilized to implement such a structure.

As disclosed in Published Unexamined Japanese Patent Application Heisei 7-262519 (1995), for example, frame plating may be used as a method for fabricating the magnetic poles that define the track width. In this method, an electrode film is formed on the base layer, and a resist layer is formed on the electrode film. This resist layer is patterned through a photolithography process to form a frame to be used for plating. Using this frame, plating is performed through the use of the electrode film previously formed as a seed layer. A plating pattern is thereby formed.

As described above, it has been desired to achieve a thin-film magnetic head having a recording head with a small track width. Therefore, when the magnetic poles are formed by frame plating, it is required to form a plating pattern wherein the pattern width is small while the film thickness is great, and the side walls are nearly orthogonal to the base surface, and part of the sidewalls forming a nearly flat surface has a sufficient height. However, it is difficult in prior art to form such a plating pattern by frame plating because it is difficult to make a resist frame that has inner walls corresponding to the geometry of the above-mentioned plating pattern. This problem will now be described.

The angle between an inner wall of the resist frame and the bottom surface thereof is hereinafter called a rising angle. The height of the part of the inner wall of the resist frame that forms a nearly flat surface is hereinafter called a straight height. It is possible to change the rising angle and the straight height by adjusting the conditions of exposing the resist through the mask pattern, such as the focal point of exposure beams.

If the distance between the base layer and the focal point of the beams above the base layer is increased, the rising angle of the resist frame exceeds 90 degrees while the straight height increases. In contrast, if the distance between the base layer and the focal point of the beams above the base layer is decreased, the rising angle of the resist frame becomes 90 degrees or smaller while the straight height decreases.

In order to obtain a thick plating pattern that does not overhang, it is preferred that the straight height of the resist frame is greater. That is, it is preferred that the rising angle of the resist frame exceeds 90 degrees.

However, in order to control the plating pattern width, it is required to measure the width of the trench of the resist frame from the outer surface of the resist frame (the outer surface of the base layer) before performing plating. The rising angle of the resist frame is required to be 90 degrees or smaller to measure the trench width of the resist frame with accuracy.

As thus described, it is difficult in prior art to achieve both a greater straight height of the resist frame and the rising angle of the resist frame of 90 degrees or smaller. It is therefore difficult to form a thick plating pattern with accuracy in dimensions.

OBJECT AND SUMMARY OF THE INVENTION

It is an object of the invention to provide a method of frame plating for making a thick plating pattern with accuracy in dimensions, and a method of forming a magnetic pole of a thin-film magnetic head for making the magnetic pole of the head with accuracy.

A method of frame plating of the invention includes the steps of: forming a frame made of a resist such that an inner wall of the frame and a bottom surface thereof form an angle greater than 90 degrees; performing heat treatment on the frame such that the angle becomes 90 degrees or smaller; and forming a plating layer by performing plating through the use of the frame having received the heat treatment.

According to the method of frame plating of the invention, the frame made of a resist is formed such that an inner wall of the frame and the bottom surface thereof form an angle greater than 90 degrees. It is thereby possible to increase the height of a portion of the inner wall of the frame that forms a nearly flat surface. Furthermore, according to the invention, heat treatment is performed on the frame such that the angle becomes 90 degrees or smaller. It is thereby possible to measure the trench width of the frame with accuracy, and to form the plating layer with accuracy in dimensions.

A method of forming a magnetic pole of a thin-film magnetic head of the invention is provided for forming a layer including a magnetic pole portion. The thin-film magnetic head comprises: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The method includes the steps of: forming a frame made of a resist such that an inner wall of the frame and a bottom surface thereof form an angle greater than 90 degrees; performing heat treatment on the frame such that the angle becomes 90 degrees or smaller; and forming the layer including the pole portion by performing plating through the use of the frame having received the heat treatment.

According to the method of forming a magnetic pole of the invention, the frame made of a resist is formed such that an inner wall of the frame and the bottom surface thereof form an angle greater than 90 degrees. It is thereby possible to increase the height of a portion of the inner wall of the frame that forms a nearly flat surface. Furthermore, according to the invention, heat treatment is performed on the frame such that the angle becomes 90 degrees or smaller. It is thereby possible to measure the trench width of the frame with accuracy, and to form the layer including the pole portion with accuracy in dimensions.

According to the method of frame plating or the method of forming a magnetic pole of the invention, the heat treatment may be performed at a temperature in the range of 70 to 90° C. in the step of performing heat treatment.

According to the method of forming a magnetic pole of the invention, the layer including the pole portion may define a track width.

Other and further objects, features and advantages of the invention will appear more fully from the following description.

BRIEF DESCRIPTION OF THE DRAWINGS

FIG. 1A and FIG. 1B are cross sections for illustrating an example of a method of manufacturing a composite thin-film magnetic head employing a method of frame plating and a method of forming a magnetic pole of an embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

DETAILED DESCRIPTION OF THE PREFERRED EMBODIMENT

Figure 5:
FIG. 5 is a cross section for illustrating the method of frame plating and the method of forming a magnetic pole of the embodiment of the invention.

A preferred embodiment of the invention will now be described in detail with reference to the accompanying drawings.

Reference is now made to FIG. 1A to FIG. 4A and FIG. 1B to FIG. 4B to describe an example of a method of manufacturing a composite thin-film magnetic head through the use of a method of frame plating and a method of forming a magnetic pole of an embodiment of the invention. FIG. 1A to FIG. 4A are cross sections each orthogonal to an air bearing surface. FIG. 1B to FIG. 4B are cross sections of the pole portion each parallel to the air bearing surface.

In the method of manufacturing the thin-film magnetic head of this example, as shown in FIGS. 1A and 1B, an insulating layer 2 made of an insulating material such as alumina ($Al_2O_3$) or silicon dioxide ($SiO_2$) whose thickness is 1 to 20 μm, for example, is deposited through a method such as sputtering on a substrate 1 made of a ceramic material such as aluminum oxide and titanium carbide ($Al_2O_3$—TiC). On the insulating layer 2 a bottom shield layer 3 made of a magnetic material and having a thickness of 0.1 to 5 μm, for example, is formed for making a reproducing head. The bottom shield layer 3 may be made of a magnetic material such as FeAiSi, NiFe, CoFe, CoFeNi, FeN, FeZrN, FeTaN, CoZrNb, or CoZrTa. The bottom shield layer 3 may be formed through sputtering or plating.

Next, a bottom shield gap film 4 having a thickness of 10 to 200 nm, for example, and made of an insulating material such as $Al_2O_3$ or $SiO_2$ is formed through a method such as sputtering on the bottom shield layer 3. On the bottom shield gap film 4, an MR element 5 for reproduction having a thickness of tens of nanometers, for example, is formed through a method such as sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed through a method such as sputtering. The electrode layers 6 are electrically connected to the MR element 5. Next, a top shield gap film 7 having a thickness of 10 to 200 nm, for example, and made of an insulating material such as $Al_2O_3$ or $SiO_2$ is formed through a method such as sputtering on the bottom shield gap film 4 and the MR element 5.

The layers making up the above-described reproducing head are patterned through an ordinary etching method using a resist pattern or liftoff, or the combination of such etching and liftoff.

Next, on the top shield gap film 7, a top-shield-layer-cum-bottom-pole-layer (called a bottom pole layer in the following description) 8 is formed. The bottom pole layer 8 has a thickness of 0.5 to 4.0 μm, for example, and is made of a magnetic material and used for both reproducing head and recording head. The bottom pole layer 8 is made of a soft magnetic material such as NiFe, CoFe, CoFeNi or FeN, and formed through a method such as sputtering or plating Next, a recording gap layer 9 made of an insulating material such as $Al_2O_3$ or $SiO_2$ whose thickness is 10 to 500 nm, for example, is formed through sputtering, for example, on the bottom pole layer 8. Next, a portion of the recording gap layer 9 located in the center portion of a thin-film coil described later is etched to form a contact hole 9a for making the magnetic path.

Next, an insulating layer 10 of a thermoset photoresist, for example, is formed in a region on the gap layer 9 where the thin-film coil is to be formed. A first layer 11 of the thin-film coil made of a conductive material such as Cu is formed on the insulating layer 10 through a method such as frame plating. Next, an insulating layer 12 of a thermoset photoresist, for example, is formed to cover the insulating layer 10 and the first layer 11 of the coil. A second layer 13 of the thin-film coil made of a conductive material such as Cu is formed on the insulating layer 12 through a method such as frame plating. Next, an insulating layer 14 of a thermoset photoresist, for example, is formed to cover the insulating layer 12 and the second layer 13 of the coil. The first layer 11 and the second layer 13 of the coil are connected to each other and wound around the contact hole 9a. The total thickness of the coil including the first layer 11 and the second layer 13 is 2 to 5 μm, for example. The total thickness of the insulating layers 10, 12 and 14 is 3 to 20 μm, for example.

Next, as shown in FIGS. 2A and 2B, a top pole layer 15 having a thickness of 3 to 5 μm, for example, is formed for the recording head in a region extending from the air bearing surface (medium facing surface) 30 through a portion on top of the insulating layers 12 and 14 to the contact hole 9a. The top pole layer 15 is made of a soft magnetic material such as NiFe, CoFe, CoFeNi or FeN. The top pole layer 15 is formed through the method of frame plating and the method of forming a magnetic pole of the embodiment of the invention.

The pole portions of the bottom pole layer 8 and the top pole layer 15 are the portions located on a side of the air bearing surface 30 and opposed to each other, the recording gap layer 9 being placed between the pole portions. In this example, the pole portion of the top pole layer 15 has a width equal to the recording track width and defines the recording track width. The bottom pole layer 8 and the top pole layer 15 are magnetically coupled to each other through the contact hole 9a.

Next, as shown in FIGS. 3A and 3B, the recording gap layer 9 is selectively etched through dry etching, using the pole portion of the top pole layer 15 as a mask. This dry etching may be reactive ion etching (RIE) using a chlorine-base gas such as $BCl_2$ or $Cl_2$, or a fluorine-base gas such as $CF_4$ or $SF_6$, for example. Next, the bottom pole layer 8 is selectively etched by about 0.3 to 0.6 μm, for example, through argon ion milling, for example. A trim structure as shown in FIG. 3B is thus formed. The trim structure suppresses an increase in the effective track width due to expansion of a magnetic flux generated during writing in a narrow track.

Next, as shown in FIGS. 4A and 4B, a protection layer 16 made of an insulating material such as $Al_2O_3$ or $SiO_2$ and having a thickness of 5 to 50 μm, for example, is formed over the entire surface through a method such as sputtering. The surface of the protection layer 16 is then flattened and pads (not shown) for electrodes are formed on the protection layer 16. Finally, lapping of the slider including the foregoing layers is performed to form the air bearing surface 30 of the thin-film magnetic head including the recording head and the reproducing head. The thin-film magnetic head of this example is thus completed.

The thin-film magnetic head of this example fabricated as thus described comprises the air bearing surface (the medium facing surface) 30, the reproducing head and the recording head. The reproducing head has: the MR element 5; and the bottom shield layer 3 and the top shield layer (bottom pole layer 8) for shielding the MR element 5. Portions of the bottom shield layer 3 and the top shield layer on a side of the air bearing surface 30 are opposed to each other, the MR element 5 being placed between these portions.

The recording head has the bottom pole layer 8 and the top pole layer 15 magnetically coupled to each other, each of which includes at least one layer. The bottom pole layer 8 and the top pole layer 15 include the pole portions opposed to each other and placed in regions on a side of the air bearing surface 30. The recording head further has: the recording gap layer 9 placed between the pole portion of the bottom pole layer 8 and the pole portion of the top pole layer 15; and the thin-film coil, including the first layer 11 and the second layer 13, at least a part of which is placed between the bottom pole layer 8 and the top pole layer 15, the at least part of the coil being insulated from the bottom pole layer 8 and the top pole layer 15. The pole portion of the top pole layer 15 defines the recording track width.

Reference is now made to FIG. 5 to FIG. 10 to describe the method of frame plating and the method of forming a magnetic pole of this embodiment that are employed for making the top pole layer 15.

In this method, as shown in FIG. 5, an electrode film 52 for plating that is made of a conductive material is formed on a base layer 51 (equivalent to the recording gap layer 9 and the insulating layers 12 and 14 of the thin-film magnetic head shown in FIGS. 4A and 4B) of a plating layer to be formed. The electrode film 52 is preferably made of a material the same as that of the plating layer to be formed.

Figure 6:
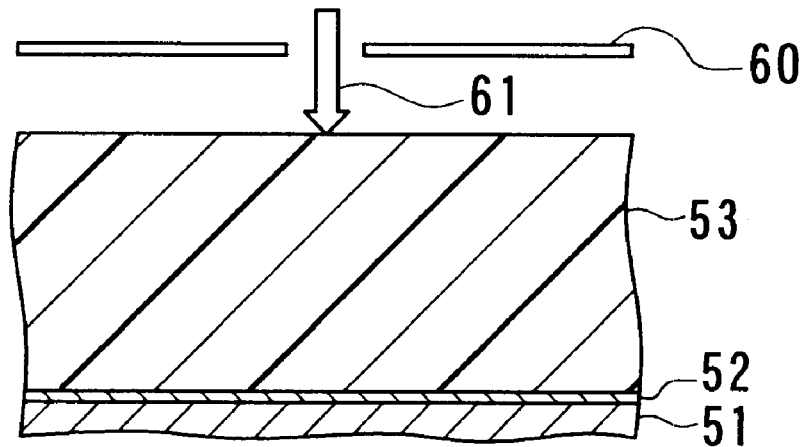
FIG. 6 is a cross section for illustrating a step that follows FIG. 5.

Next, as shown in FIG. 6, a positive resist such as a photoresist is applied on the electrode film 52 to form a positive resist layer 53. The resist layer 53 is then exposed to beams 61 for exposure such as light beams through the use of a mask 60. The mask 60 includes a region through which the beams pass, the region corresponding to the shape of the plating layer to be formed.

Figure 7:
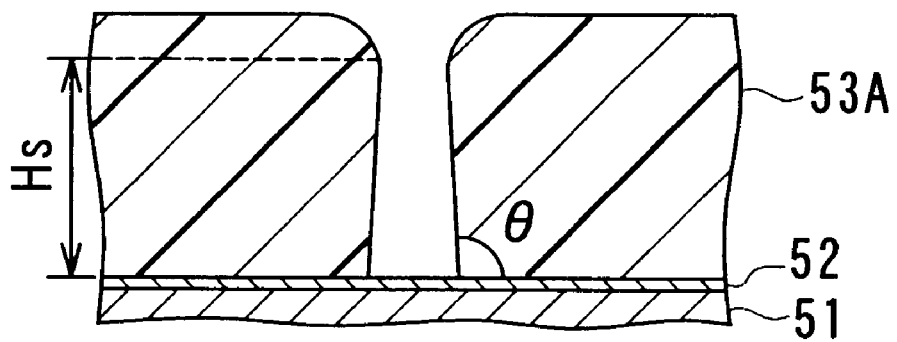
FIG. 7 is a cross section for illustrating a step that follows FIG. 6.

Next, as shown in FIG. 7, the resist layer 53 exposed is developed and the exposed portions are removed to form a resist frame 53A. The angle between an inner wall of the resist frame 53A and the bottom surface thereof is hereinafter called a rising angle and indicated with θ. In this embodiment the resist frame 53A is formed such that the rising angle θ exceeds 90 degrees by adjusting the focal point of exposure beams when the resist layer 53 is exposed.

The resist frame 53A has a part extending from its lower end to the neighborhood of its upper end that forms a nearly flat surface. The height of this part is hereinafter called a straight height and indicated with Hs.

Figure 8:
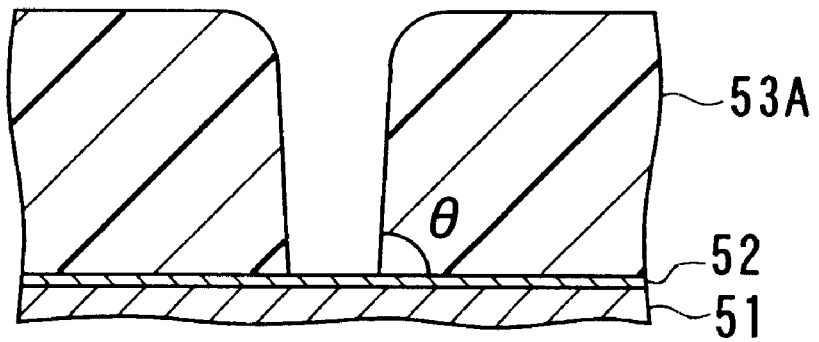
FIG. 8 is a cross section for illustrating a step that follows FIG. 7.

Next, as shown in FIG. 8, heat treatment is performed on the resist frame 53A such that the rising angle θ becomes 90 degrees or smaller. The conditions of heat treatment will be described later.

Figure 9:
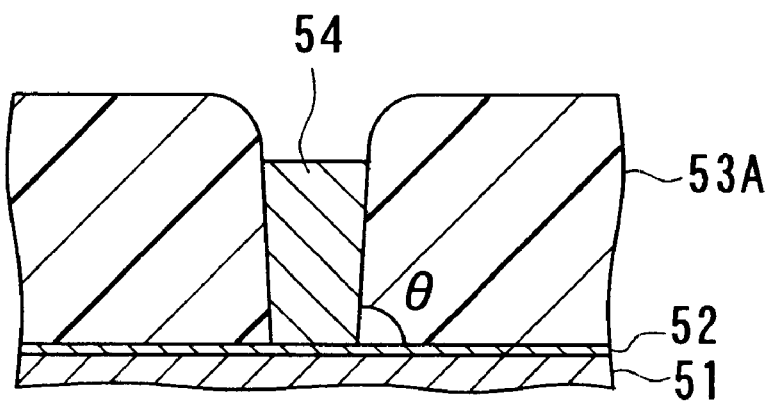
FIG. 9 is a cross section for illustrating a step that follows FIG. 8.

Next, as shown in FIG. 9, plating is performed with the electrode film 52 as a seed layer through the use of the resist frame 53A having received heat treatment. The plating layer 54 is thereby formed.

Figure 10:
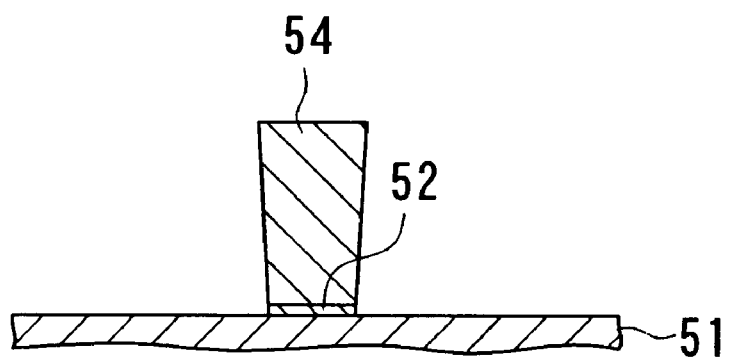
FIG. 10 is a cross section for illustrating a step that follows FIG. 9.

Next, as shown in FIG. 10, the resist frame 53A is lifted off through the use of an organic solvent. The seed layer 52 except a portion below the plating layer 54 is removed by dry etching such as ion milling or reactive ion etching, or wet etching.

The plating layer 54 thus formed corresponds to the top pole layer 15 of the thin-film magnetic head shown in FIGS. 4A and 4B.

Figure 11A:
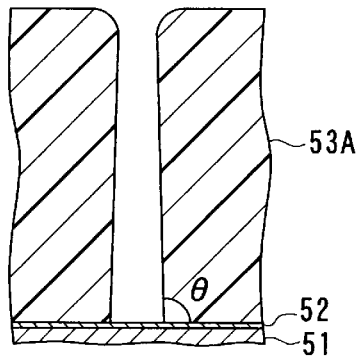
FIG. 11A to FIG. 11E illustrate the relationship between the focal point of exposure beams when the resist layer is exposed and the shape of the resist frame thereby obtained.
Figure 11D:
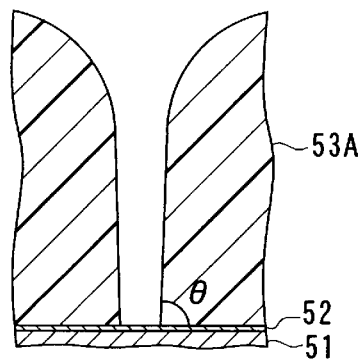
Figure 11B:
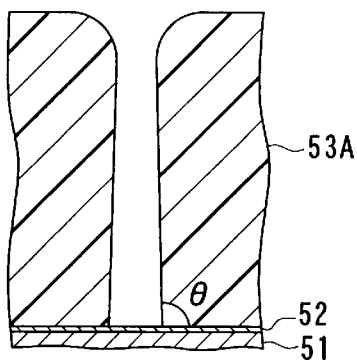
Figure 11E:
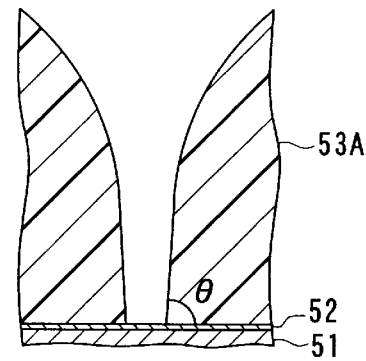
Figure 11C:
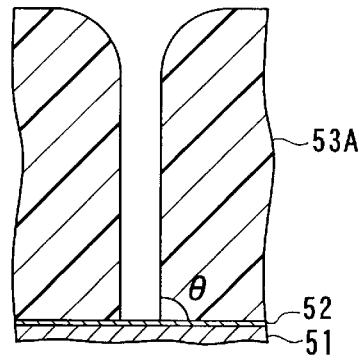

Reference is now made to FIG. 11A to FIG. 11E to describe the relationship between the focal point of exposure beams when the resist layer 53 is exposed and the shape of the resist frame 53A thereby obtained. FIG. 11A to FIG. 11E illustrate variations in the shape of the resist frame 53A when the focal point of the exposure beams is changed. FIG. 11A to FIG. 11E illustrate the shapes of the resist frame 53A corresponding to different focal points. FIG. 11A illustrates the case in which the focal point above the base layer is farthest from the base layer. FIG. 11B illustrates the case in which the focal point is closer to the base layer than the case shown in FIG. 11A. FIG. 11C illustrates the case in which the focal point is closer to the base layer than the case shown in FIG. 11B. FIG. 11D illustrates the case in which the focal point is closer to the base layer than the case shown in FIG. 11C. FIG. 11E illustrates the case in which the focal point is closer to the base layer than the case shown in FIG. 11D. The trench width at the bottom of the resist frame 53A is 1 μm in FIG. 11A to FIG. 11E.

As shown in FIG. 11A to FIG. 11E, as the distance from the base layer to the focal point of the exposure beams above the base layer increases, the rising angle θ of the resist frame 53A exceeds 90 degrees while the straight height increases. In contrast, as the distance from the base layer to the focal point of the exposure beams above the base layer decreases, the rising angle θ of the resist frame 53A becomes 90 degrees or smaller while the straight height decreases. The reason the shape of the resist frame 53A changes in response to the focal point of the beams as described above is that the distribution of energy accelerating the chemical action of resist in the resist layer changes in response to the focal point of the beams.

Therefore, if the resist frame 53A is formed before heat treatment such that the rising angle θ exceeds 90 degrees as in this embodiment, the straight height of the resist frame 53A is made greater, which is effective for obtaining a thick plating pattern without overhanging. However, since the rising angle θ exceeds 90 degrees, it is difficult to measure the trench width at the bottom of the resist frame 53A from the outer surface of the frame 53A with accuracy.

Therefore, in this embodiment, heat treatment is performed on the resist frame 53A after its development. Although the frame 53A contracts through this heat treatment, the position of the bottom of the frame 53A will not change, since the bottom is fixed to the electrode film 52, while the upper part of the frame 53A more greatly contracts. As a result, the rising angle θ of the frame 53A is made smaller through the heat treatment. In this embodiment the heat treatment is performed such that the rising angle θ becomes 90 degrees or smaller by choosing the suitable conditions of heat treatment. It is thereby possible to measure the trench width at the bottom of the frame 53A from the outer surface of the frame 53A with accuracy while the straight height of the frame 53A is kept high.

Figure 12:
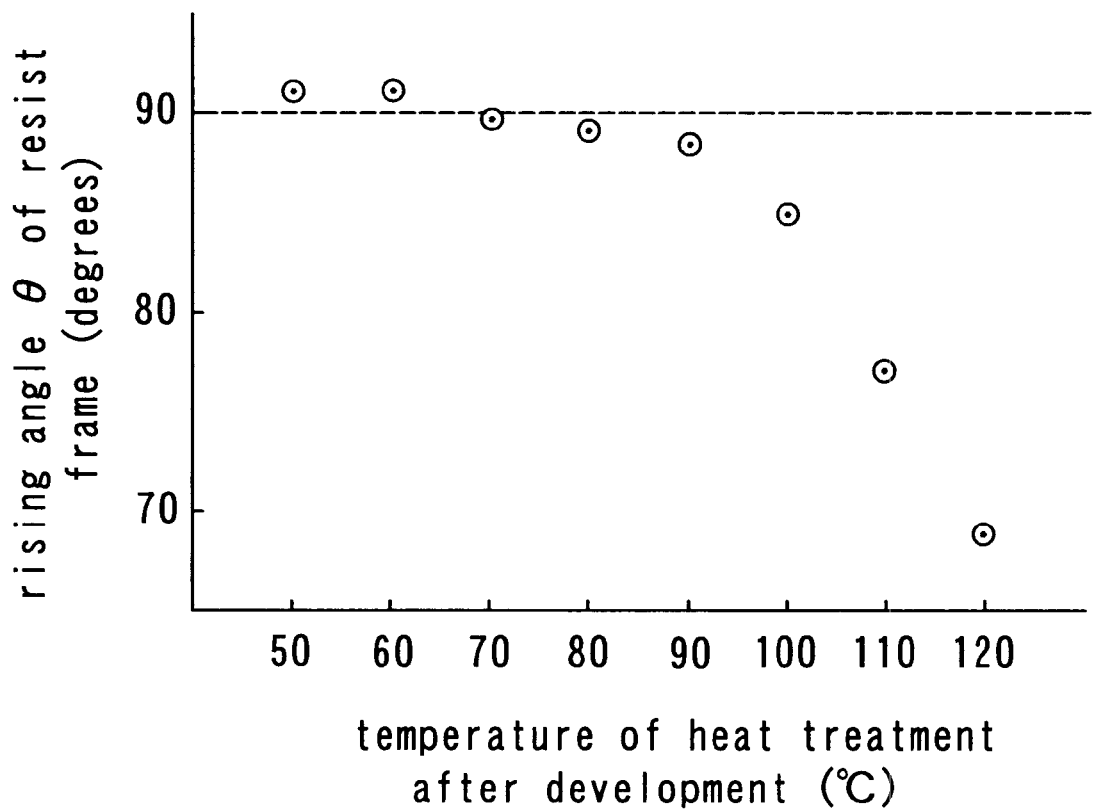
FIG. 12 a plot illustrating an example of the relationship between the rising angle of the resist frame and the temperature of heat treatment performed after development of the resist frame of the embodiment.

Reference is now made to FIG. 12 to describe the conditions of heat treatment performed on the resist frame 53A. FIG. 12 illustrates an example of the relationship between the rising angle θ of the frame 53A and the temperature of heat treatment performed after development of the frame 53A. In this example the resist utilized was the SIPR-9740 (product name) of Shin-Etsu Chemical Co., Ltd. The thickness of the frame 53A was 6 μm. The straight height was 4.5 μm. The rising angle θ before heat treatment was approximately 91 degrees. The duration of heat treatment was 90 seconds.

According to the example shown in FIG. 12, it is noted that the preferable range of temperatures of heat treatment is 70 to 90° C. If the temperature is lower than 70° C., no great change results in the rising angle θ of the frame 53A. If the temperature is greater than 90° C., the rising angle θ becomes too small and the resist is made flat. The straight height is thereby made smaller.

Although the optimal heat treatment temperature range depends on the type of resist or the treatment duration, the range is 70 to 90° C. in most cases. Therefore, the heat treatment is preferably performed at a temperature in the range of 70 to 90° C.

Figure 13:
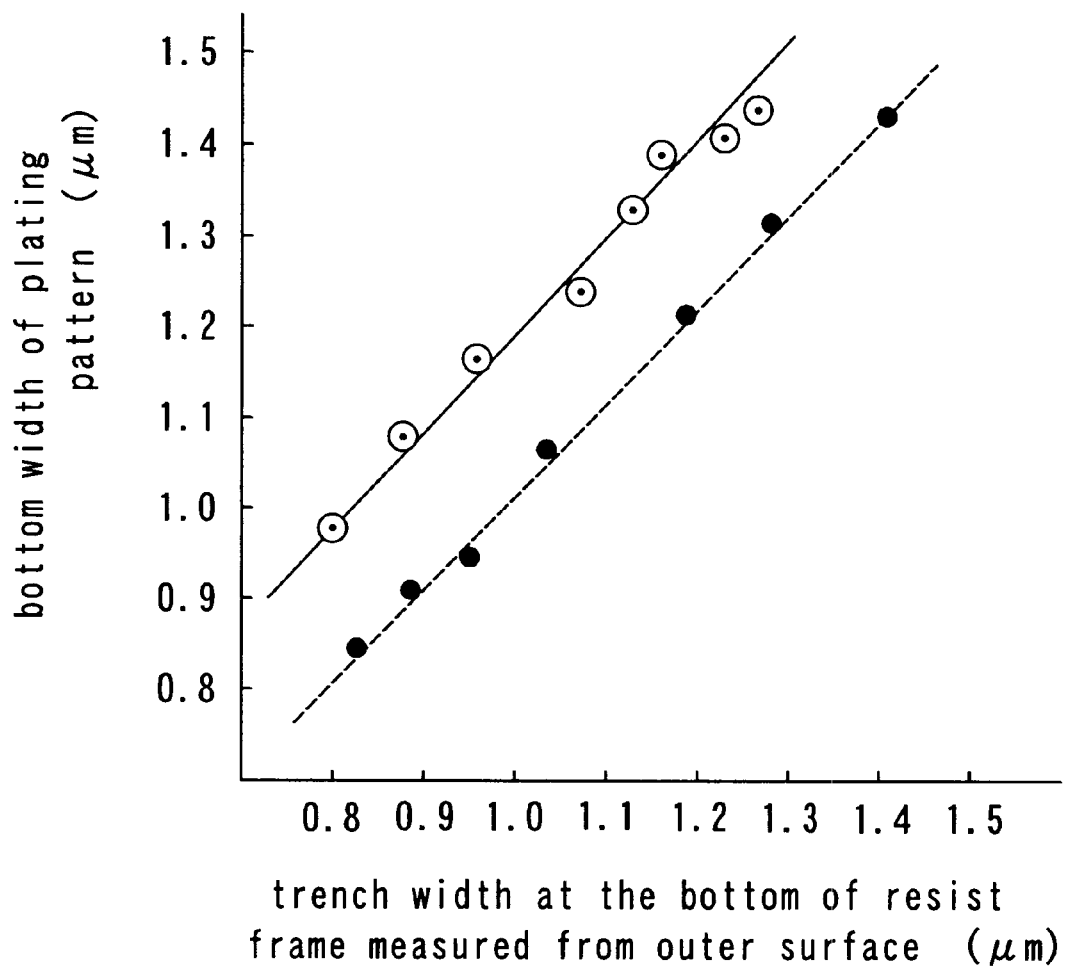
FIG. 13 is a plot illustrating an example of the relationship between the trench width at the bottom of the resist frame measured from the outer surface of the frame and the width of the bottom of the plating pattern formed through the use of the frame.

FIG. 13 illustrates an example of the relationship between the trench width at the bottom of the resist frame 53A measured from the outer surface of the frame 53A and the width of the bottom of the plating pattern formed through the use of the frame 53A. In FIG. 13 white dots indicate the case in which the resist frame 53A on which no heat treatment had been performed after exposure, that is, of which the rising angle θ was greater than 90 degrees, was used. Black dots indicate the case in which the resist frame 53A on which the heat treatment of the embodiment of the invention had been performed after exposure, that is, of which the rising angle θ was 90 degrees or smaller, was used. In this example the resist utilized was the SIPR-9740 (product name) of Shin-Etsu Chemical Co., Ltd. The thickness of the frame 53A was 6 μm. The straight height was 4.5 μm. The thickness of the plating pattern was 4.0 μm. The heat treatment temperature was 80° C. The duration of heat treatment was 90 seconds. The trench width at the bottom of the frame 53A and the width of the bottom of the plating pattern were measured by the measuring instrument S-7800 (product name) of Hitachi, Ltd.

As shown in FIG. 13, there was a difference of about 0.2 μm between the trench width at the bottom of the frame 53A measured from the outer surface of the frame 53A and the width of the bottom of the plating pattern, when the resist frame 53A on which no heat treatment had been performed after exposure, that is, of which the rising angle θ was greater than 90 degrees, was used. In contrast, there was almost no difference between the trench width at the bottom of the frame 53A measured from the outer surface of the frame 53A and the width of the bottom of the plating pattern, when the resist frame 53A on which the heat treatment had been performed after exposure, that is, of which the rising angle θ was 90 degrees or smaller, was used. As thus described, according to the embodiment of the invention, it is possible to measure the trench width at the bottom of the frame 53A with accuracy.

According to the method of frame plating of the embodiment thus described, the resist frame 53A is first formed such that the rising angle θ exceeds 90 degrees, and heat treatment is performed on the frame 53A after development of the frame 53A, so that the rising angle θ is made 90 degrees or smaller. As a result, it is possible to measure the trench width at the bottom of the frame 53A from the outer surface of the frame 53A with accuracy while the straight height of the frame 53A is kept high. It is thereby possible to form a thick plating pattern with accuracy in dimensions.

According to the method of forming a magnetic pole of the embodiment, the top pole layer 15 including the pole portion that defines the recording track width is formed through the use of the above-described method of frame plating. As a result, it is possible to form the magnetic pole that defines the recording track width of the thin-film magnetic head with accuracy. It is thereby possible to control the recording track width with accuracy.

The present invention is not limited to the foregoing embodiment but may be practiced in still other ways. For example, the method of frame plating of the invention is not limited to formation of the top pole layer that defines the recording track width of the thin-film magnetic head, but may be employed to form the bottom pole layer. If the top or bottom pole layer includes two or more layers, the method of frame plating of the invention may be applied not only to formation of the layer of the top or bottom pole layer including the pole portion, but to formation of layers not including the pole portion. Furthermore, the method of frame plating of the invention may be applied not only to formation of a pole layer of the thin-film magnetic head, but to formation of various sorts of plating patterns.

In the foregoing embodiment, the thin-film magnetic head is described, comprising the MR element for reading formed on the base body and the induction-type electromagnetic transducer for writing stacked on the MR element. Alternatively, the MR element may be stacked on the electromagnetic transducer.

That is, the induction-type electromagnetic transducer for writing may be formed on the base body and the MR element for reading may be stacked on the transducer. Such a structure may be achieved by forming a magnetic film functioning as the top pole layer of the foregoing embodiment as a bottom pole layer on the base body, and forming a magnetic film functioning as the bottom pole layer of the embodiment as a top pole layer facing the bottom pole layer with the recording gap film in between. In this case it is preferred that the top pole layer of the induction-type electromagnetic transducer functions as the bottom shield layer of the MR element, too.

The invention may be applied to a thin-film magnetic head dedicated to writing that has an induction-type electromagnetic transducer only or to a thin-film magnetic head performing writing and reading through an induction-type electromagnetic transducer.

According to the method of frame plating of the invention described so far, the frame made of a resist is formed such that an inner wall of the frame and the bottom surface thereof form an angle greater than 90 degrees. Heat treatment is then performed on the frame such that the angle becomes 90 degrees or smaller. The plating layer is formed through the use of this frame. It is thereby possible to measure the trench width at the bottom of the frame with accuracy while the height of a portion of the inner wall of the frame forming a nearly flat surface is kept high. As a result, it is possible to form a thick plating pattern with accuracy in dimensions.

According to the method of forming a magnetic pole of the invention, the frame made of a resist is formed such that an inner wall of the frame and the bottom surface thereof form an angle greater than 90 degrees. Heat treatment is then performed on the frame such that the angle becomes 90 degrees or smaller. The layer including the pole portion is formed through the use of this frame. It is thereby possible to measure the trench width at the bottom of the frame with accuracy while the height of a portion of the inner wall of the frame forming a nearly flat surface is kept high. As a result, it is possible to form the magnetic pole of the thin-film magnetic head with accuracy.

According to the method of forming a magnetic pole of the invention, the layer including the pole portion may define the track width. It is thereby possible to control the track width of the thin-film magnetic head with accuracy.

Obviously many modifications and variations of the present invention are possible in the light of the above teachings. It is therefore to be understood that within the scope of the appended claims the invention may be practiced otherwise than as specifically described.

What is claimed is:

1. A method of frame plating including the steps of:

forming a frame made of a resist such that an inner wall of the frame and a bottom surface thereof form an angle greater than 90 degrees;

performing heat treatment on the frame such that the angle becomes 90 degrees or smaller; and forming a plating layer by performing plating through the use of the frame having received the heat treatment.

2. The method according to claim 1 wherein the heat treatment is performed at a temperature in the range of 70 to 90° C. in the step of performing heat treatment.

3. A method of forming a magnetic pole of a thin-film magnetic head provided for forming a layer including a magnetic pole portion, the thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers; the method including the steps of:

forming a frame made of a resist such that an inner wall of the frame and a bottom surface thereof form an angle greater than 90 degrees;

performing heat treatment on the frame such that the angle becomes 90 degrees or smaller; and forming the layer including the pole portion by performing plating through the use of the frame having received the heat treatment.

4. The method according to claim 3 wherein the heat treatment is performed at a temperature in the range of 70 to 90° C. in the step of performing heat treatment.

5. The method according to claim 3 wherein the layer including the pole portion defines a track width.

* * * * *